(12) United States Patent
Grossman (10) Patent No.: US 7,640,208 B2
(45) Date of Patent: Dec. 29, 2009

(54) SYSTEM AND METHOD FOR PROCESSING ORDERS FOR SECURITIES

(75) Inventor: Karl Grossman, Tokyo (JP)

(73) Assignee: Barclays Capital Inc., New York, NY (US)

( * ) Notice: Subject to any disclaimer, the term of this patent is extended or adjusted under 35 U.S.C. 154(b) by 454 days.

(21) Appl. No.: 11/592,710

(22) Filed: Nov. 3, 2006

(65) Prior Publication Data

US 2007/0100742 A1    May 3, 2007

Related U.S. Application Data

(60) Provisional application No. 60/733,246, filed on Nov. 3, 2005.

(51) Int. Cl.
  *G06Q 40/00* (2006.01)
(52) U.S. Cl. .......................................... 705/37; 705/35
(58) Field of Classification Search ................... 705/35, 705/37
  See application file for complete search history.

(56) References Cited

U.S. PATENT DOCUMENTS

| | | | |
|---|---|---|---|
| 7,162,448 B2* | 1/2007 | Madoff et al. ................. | 705/37 |
| 2002/0184136 A1 | 12/2002 | Neubert et al. | |
| 2004/0024689 A1* | 2/2004 | Zhou et al. .................... | 705/37 |
| 2004/0143542 A1 | 7/2004 | Magill et al. | |
| 2004/0210511 A1 | 10/2004 | Waelbroeck et al. | |
| 2004/0243505 A1* | 12/2004 | Sweeting et al. ............. | 705/37 |
| 2005/0240510 A1 | 10/2005 | Schweickert et al. | |
| 2005/0240513 A1* | 10/2005 | Merold ......................... | 705/37 |
| 2006/0229967 A1* | 10/2006 | Sweeting ...................... | 705/37 |

OTHER PUBLICATIONS

Traders Magazine: "News Alert: New Morgan Stanley Dark Liquidity Pool Goes Live"; Traders Magazine, One State Street Plaza, New York, New York 10004; 2006 Traders Magazine and SourceMedia, Inc.; 1 page.
International Search Report and Written Opinion; International Application No. PCT/US06/43121; 7 pages.

* cited by examiner

*Primary Examiner*—Jagdish N Patel
(74) *Attorney, Agent, or Firm*—Morgan Lewis & Bockius LLP (57) ABSTRACT

Trade processing system and method. Tiers are established, representing a range of values associated with a trade size and a percentage of an average daily volume of trading in a security. The tiers are associated with a price improvement. An order, associated with an order size, to trade in the security is received. The tier within which the order falls is determined based on the order size and the percentage of the average daily volume. At least a portion of the order is automatically executed with the price improvement associated with the determined tier. Depending on the manner in which the order is flagged, it may be processed in accordance with one of a plurality of workflows. Partial order fills are also supported.

20 Claims, 5 Drawing Sheets

SYSTEM AND METHOD FOR PROCESSING ORDERS FOR SECURITIES

CROSS REFERENCE TO RELATED APPLICATIONS

This application claims priority to U.S. Provisional Patent Application No. 60/733,246, filed Nov. 3, 2005, which application is hereby incorporated by reference in its entirety.

FIELD OF THE INVENTION

The present invention relates to processing low notional value orders for securities.

BACKGROUND OF THE INVENTION

In certain circumstances, a client of a securities trading firm may want to place stock orders that are of a low notional value. Traders are often unable to add value to such orders, but are required to execute them nonetheless. In addition, prior art systems are manual, thereby creating even greater inefficiency in requiring traders to work on such orders manually.

SUMMARY OF THE INVENTION

The present invention is directed to a system and method for processing an order to trade securities. One or more tiers are established. The tiers represent a range of values associated with a trade size and a percentage of an average daily volume of trading in a security. Each of one or more of the tiers is associated with a price improvement. An order to trade in the security is received. The order is associated with an order size. The tier within which the order falls is determined based on the order size and the average daily volume. At least a portion of the order is automatically executed with the price improvement associated with the determined tier.

The present invention is further directed to a system and method for processing an order to trade securities. An order to trade securities is received. The order is associated with an indication. Based on the indication, the order is processed in accordance with one of a plurality of workflows. In accordance with at least one of the plurality of workflows, at least a portion of the order is automatically executed with a price improvement if the order meets one or more eligibility requirements, or is processed manually if the order fails to meet the eligibility requirements. In accordance with at least one other of the plurality of workflows, the order is returned unfilled if it fails to meet the eligibility requirements.

The present invention is still further directed to a method and system for processing orders to trade securities. One or more tiers are established. The tiers represent a range of values associated with a trade size and a percentage of an average daily volume of trading a security. Each of the one or more of the tiers is associated with a price improvement. An order to trade in the security is received. The order is associated with an order size and an indication. The tier within which the order falls is determined based on the order size and the average daily volume. Based on the indication, the order is processed in accordance with one of a plurality of workflows. In accordance with at least one of the plurality of workflows, a portion of the order, up to the size associated with the determined tier, is automatically executed with the price improvement associated with the determined tier if the order meets one or more eligibility requirements, and a residual of the order exceeding the size associated with the determined tier is processed manually. In accordance with at least one other of the plurality of workflows, the residual of the order exceeding the size associated with the determined tier is returned unfilled.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention provides an efficient manner of executing securities trades, particularly those of low notional value. In particular, clients receive a price improvement on the fill and receive a guaranteed execution if the notional value is smaller than a certain threshold. By automating this order flow, the firm can provide a better execution to the client in the form of a price improvement. In the preferred embodiment, automatic execution is offered on low notional value orders without requiring the client to select the offering explicitly. The system supports multiple asset classes (i.e., equities and equity derivatives), as well as synthetics. The DTC system is risk-based meaning that orders (meeting the appropriate criteria) are automatically executed with a guaranteed price improvement, regardless of the state of the market, and the firm takes on any non natural trades as risk.

Figure 1:
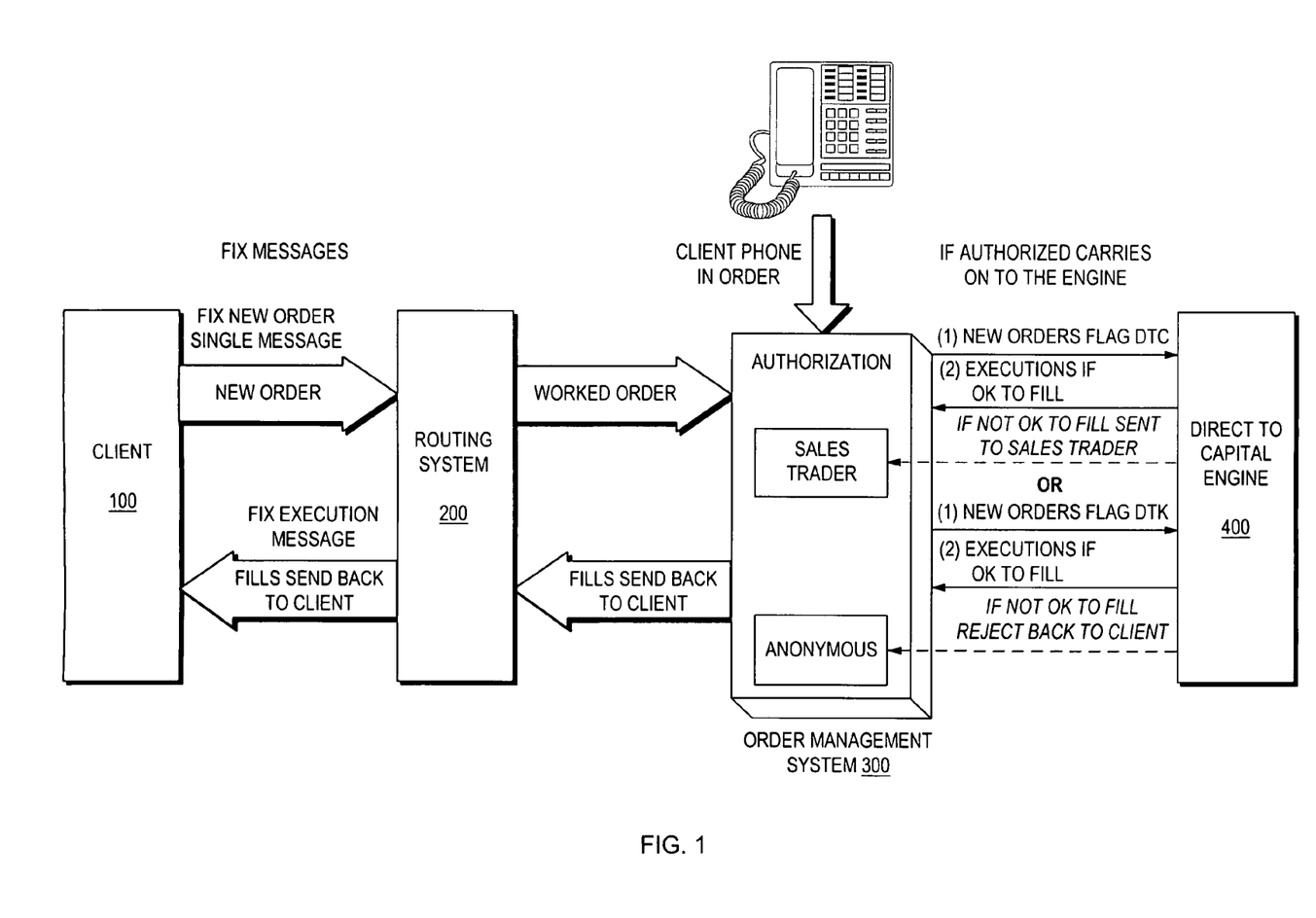
FIG. 1 is an exemplary system, and associated workflow, for carrying out a preferred embodiment of the present invention.

FIG. 1 illustrates an exemplary system, and accompanying work flow, that may be used in connection with a preferred embodiment of the present invention. The firm 200 receives new orders from, or on behalf of clients 100, electronically over a network using, e.g., the Financial Information eXchange ("FIX") protocol, an industry-standard trading protocol. Such orders are handled, in the first instance, by the firm's order routing system. The order is booked as a worked order and routed to the order management system 300. Order may also come in to the order management system 300 manually (i.e., not via FIX), as a phone order.

The way in which the order management system 300 handles such orders is determined based on the way in which the order is flagged. In particular, the client can flag the order identifying the intended execution service—Direct to Capital ("DTC") or Auto-execute or Kill ("DTK") described in more detail below. Orders may be flagged by the client using a customization of the FIX protocol described below, or phone orders may be flagged manually by the Sales Trader.

Flagged orders, if authorized (i.e., if the client is enabled to use the DTC system) are processed by the DTC engine 400. Orders flagged for the DTC execution channel are executed with a price improvement as per the client's entitlements (e.g., in accordance with the tiers described below). If the order does not meet the necessary criteria (e.g., the order supersedes the agreed consideration), the order is sent to the Sales Trader to be executed as a typical worked order. Orders flagged for the DTK execution channel are processed in a manner that is identical to that of DTC, except that orders with a DTK flag will be returned to the client, unfilled, if they are rejected by the auto-execution service. DTK provides the client with an anonymous trading channel, if desired.

A client can be set to one of three states regarding whether a trade will be executed automatically: On, Off or Explicit. If the automatic state is set to "On" for a given client, any order that is received for that client (i.e., through FIX or as a phone order), even if the order is not flagged, is processed using the DTC engine as if it were flagged DTC. "Explicit" refers to flagged orders. For clients in the "Explicit" state, only orders carrying a special DTC or DTK flag will be checked for auto-execution. If this flag is missing, the order will not get checked against the auto-execution service. Within the "Explicit" routing option, there are two scenarios that are supported via the FIX protocol, as shown in Tables 1 and 2. These tables represent one way in which the FIX protocol could be altered in order to process orders received via FIX using the DTC engine.

TABLE 1

Basic text based solution - client adds DTC/DTK to Tag 58 (Text)

| Option | TAG No. | Field Name | Type | Description/Comments |
|---|---|---|---|---|
| 1 | 58 | Text | Char | DTC or DTK as the first entry |

TABLE 2

Advanced FIX tag approach - client adds DTC/DTK to Tag 57 (Target Sub ID)

| Option | TAG No. | Field Name | Type | Description/Comments |
|---|---|---|---|---|
| 1 | 57 | TargetSubID | Char | Values = DTC or DTK It will be necessary for clients that wish to explicitly call the DTC offering to provide these tags. |

In some embodiments, exceptions may be put in place for some clients. In an exemplary exception, if a client cannot provide the expected tag information, the order may be overridden when it arrives at the routing system of the firm 200. For example, DTC or DTK may be stamped by the routing system on every order received from a particular client by the firm; these orders will then be treated as if the client had flagged the orders itself. Another example of this exception assumes that the client cannot send correct handling instructions. In this instance, the values sent by the client via the FIX protocol can be overridden (e.g., 21=1 (no broker intervention) is changed to 21=3 (manual best execution)).

In a preferred embodiment of the present invention, a number of different types of entitlements may be implemented, meaning that only certain clients are able to have certain types of orders auto-executed with a price improvement. For example, certain clients may be entitled to have orders for particular types of instrument processed by the inventive system (e.g., equities—single only). By way of further example, clients may only be authorized to trade in particular markets, and orders will be rejected if they are not within an established market for that client, or not within a market to which connectivity can be offered.

DTC order types may have their own specific entitlements, in the preferred embodiment. For example, clients can be enabled or disabled for auto-execution of stocks on an exchange-by-exchange basis. For example, a client may currently be enabled to auto-execute on all exchanges except Italy.

The decision as to whether an order is eligible for auto-execution and a price improvement, and the size of the price improvement, is determined by reference to a matrix, in the preferred embodiment.

An exemplary matrix (illustrated in Table 3) includes several tiers. In the illustrated example, five tiers are used. However, any number of tiers can be used in connection with the present invention. The tiers represent ranges of values associated with the size of the order that the firm will accept for auto-execution. In Table 3, the X variable represents the size of a given order; the Y variable represents the percentage value of the average daily volume ("ADV") traded on the market in that security and the x variable represents the percentage value of the price improvement for a given tier. In a typical embodiment, the values associated with the X, Y and x variables are different for each tier. Specific values are not associated with these variables in the example shown, as such values can be set as appropriate for a given firm/client. Typically, the price improvements offered are based on limits agreed to with clients in advance. A given order received by the firm will, first, be checked against tier 1; if it falls within the limits of tier 1, it will be executed with the price improvement associated with that tier. If not executable in tier 1, it will be checked against tier 2, and so on. In a preferred embodiment, any given tier may not be used for a specific client (i.e., different tiers may be offered to some clients and not others based on the client's status with the firm).

TABLE 3

Stage 1 Exemplary Matrix

|  | Tier 1 | Tier 2 | Tier 3 | Tier 4 | Tier 5 |
|---|---|---|---|---|---|
| Condition | <X and <Y % ADV | <X and <Y % ADV | <X and <Y % ADV | <X and <Y % ADV | <X and <Y % ADV |
| Improvement | x % | x % | x % | x % | x % |

The DTC engine 400 checks as to whether orders are available for auto-execution and a price improvement, in accordance with various stages, in the preferred embodiment. In particular, if an order is in a particular state that requests consideration for DTC (e.g., is flagged accordingly), then the order will pass through the stages set forth above in the exemplary matrix, from left to right, to determine eligibility for auto-execution. Moving from left to right in this table, the X value goes up; the Y value goes up; and the x value goes down. Thus, as received orders increase in size (X) and % ADV (Y) they will receive a smaller price improvement (x).

In the preferred embodiment, the class of the stock is also taken in consideration in determining whether an order for such stock is eligible for auto-execution and a price improvement. Class 0 is the default, effectively meaning un-classified. Class 5 stocks are high liquidity stocks for which the largest size order may be eligible for auto-execution and a price improvement. Class 1 stocks, on the other hand, have limited liquidity. For each client, a limit table is specified, from which the maximum dollar values for auto-execution of differently classified stocks can be queried.

Velocity checking may be implemented in connection with placing and filling of orders using the system described herein. The following provides an algorithm describing how velocity checking may be implemented. The following quantities are typically client- and security-specific:

$s_t$ number of shares a client wants to trade in a specific security at time t.

$l_{max}$ maximum number of shares a client is able to trade in one clip, based on his/her setup, i.e., the highest possible number of shares in a specific security according to client tier and ADV limits.

$l_{dyn,t}$ dynamic limit of the number of shares a client is allowed to traded at time t $l_{used,t}$ number of shares which are currently used up from the max limit at time t $v_t$ cumulative exchange volume in a specific security at time t t points in time when a client traded in a specific security, t=0 is defined as beginning of the day.

r percent of permissible volume rate, typically 20% or 25%.

Initial values, at the beginning of the day:

$$l_{used,0}=0$$

$$v_0=0$$

If a client tries to trade $s_t$ shares of a specific security at time t, let $$l_{dyn,t}=\max(0.0, l_{used,t-1}-(v_t-v_{t-1})\cdot r),$$

then the trade is accepted by the safety check, if the following condition holds true:

$$s_t \leq l_{dyn,t}$$

$l_{used,t}$ is updated thereafter:

$$l_{used,t}=\min(l_{max}, l_{used,t}+|s_t|)$$

Figure 2:
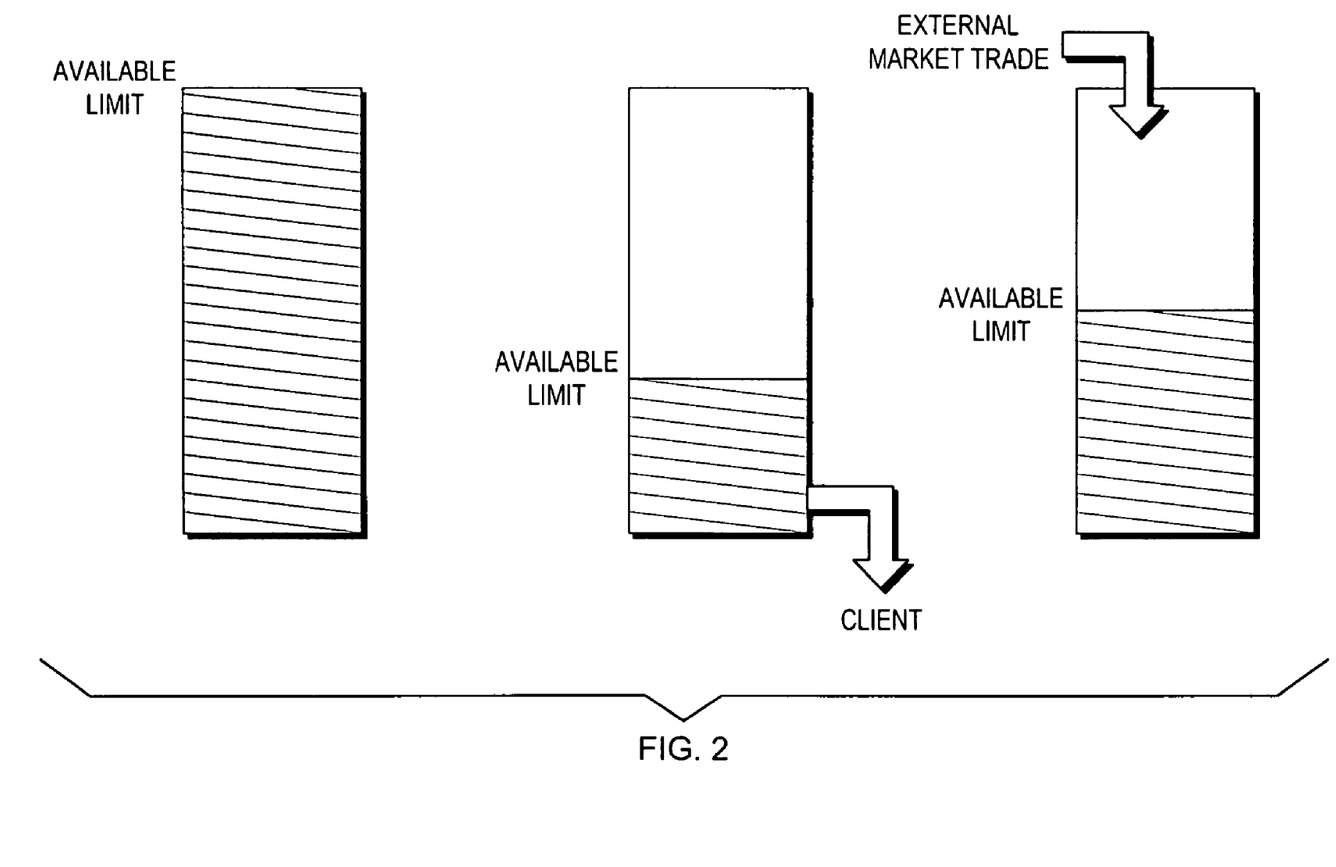
FIG. 2 is a logical representation of velocity checking.

The velocity checking is used to limit, dynamically, trading in line with market volume. Conceptually, the principle of velocity checking can be explained with reference to a receptacle holding a liquid. The amount of liquid in the receptacle represents the dynamic client limit. At the start of the day, the receptacle is fully filled. Each time the client trades, liquid is removed in proportion from the receptacle. The receptacle is replenished in line with external market volume, as shown in FIG. 2.

Synthetic equities represent derivative products structured around the market performance of underlying equity instruments. Such contracts have a number of commercial benefits to clients, including the ability to short, inclusion of leverage and ease and reduced cost of settlement. The system supports synthetic equity orders. Cash Settled (DVP) Represents physical delivery of stock on a delivery verses payment (DVP) basis. Contract for differences (CFD) represent over the counter derivatives products whereby the firm and the client agree to exchange cash flows over time based on the movement of a single security. An equity swap is a contract between two parties who agree to exchange cash flows, over a defined time, based on the movement of reference equity and interest instruments. Swaps allow a client to trade a changing portfolio of securities over time within one single equity swap. Requests for market data relate to the scenario in which a client wishes to enter into a CFD or an equity swap with a third party broker but communicates with the firm, as well the third party broker, in relation thereto. The legal documentation required in this regard confirms that the client is only requesting the firm to provide it with market data in relation to a reference equity transaction (such as data relating to pricing, availability, capacity, etc) (known as a "Request For Market Data") rather than submitting an cash equity order. The firm may make a speculative purchase of the equities corresponding to a Request For Market Data which we may offer to the third party CFD/swap provider as a ready hedge to the CFD/swap it will be writing. The firm's documentation sets out that neither the Request For Market Data nor the firm's provision of data in respect thereto amounts to an agreement for the purchase or transfer of securities. Core requirements for trading synthetics via the DTC product are to: Entitle clients on a per market basis for CFDs, RFMD/IP and Swap when sending orders to the DTC product. Pass appropriate flags (tag 775 and 7750) to downstream systems (primarily, the DTC engine).

Table 4 sets forth the tags that may be used, in conjunction with the FIX protocol, for synthetics.

TABLE 4

| TAG | LTAG | Field name | Type | Description/Comments |
|---|---|---|---|---|
| 775 | 775 | BookingType | Int | Method for booking out this order. Used when notifying a broker that an order to be settled by that broker is to be booked out as an OTC derivative (e.g. CFD or similar). If not specified will default to cash. Valid values:<br><br>0 = Regular booking (default)<br>1 = CFD (Contract For Difference)<br>2 = Total return swap<br>3 = RFMD (1003) |

Synthetics are routed in the same way in which other orders with DTC flags are routed. Below shows exemplary ways in which the FIX protocol could be altered to handle synthetics. The below identifies "Basic" approach:
    Tag 1 mappings—bespoke (eg Dexia: "CSFB_IP)
    Tag 58: CFD/SWP/IP "Advanced" approach:
    Tag 775: 1=CFD; 2=SWP; 3=IP
    Tag 7750: 1=CFD; 2=SWP; 3=IP Default:
    Set CFD/SWP/IP as default in FIRST to override whatever client sends.

The client can only amend an order once it is carried on as a worked order for DTC (i.e., when the order arrives on the Sales Trader's desk for manual working, the Sales Trader can amend it). For DTK, amendments are not permitted.

A preferred embodiment of the system is set up to reject orders in a variety of circumstances such as, for example: the client is not authorized to use the system; the client is not authorized to send a CFD or Swap or RFMD; the client has been disabled; the order exceeds the client limit; lack of liquidity of the stock that is the subject of the order; the client sends both a DTC and DTK flag in the text field; receipt of a cancel/amend message; or the client sends anything other than 21=3 (unless an exception is implemented).

As well as providing complete execution for orders that fall within the tiers described above, the DTC engine also has the ability to partially fill an order up to the specified limit and then reject the residual of the order. In the case an order is flagged DTK, the residual of the order will be rejected directly back to the client, unfilled. In the case of the DTC flag, the residual will go on to the Sales Trader to be manually worked.

The methods of the present invention for processing orders to trade securities are illustrated in the following flow charts. The steps identified in these flow charts do not necessarily dictate the order in which the steps need be carried out. Further, one or more of the steps of the method may be carried out by software running on a data processing apparatus.

Figure 3:
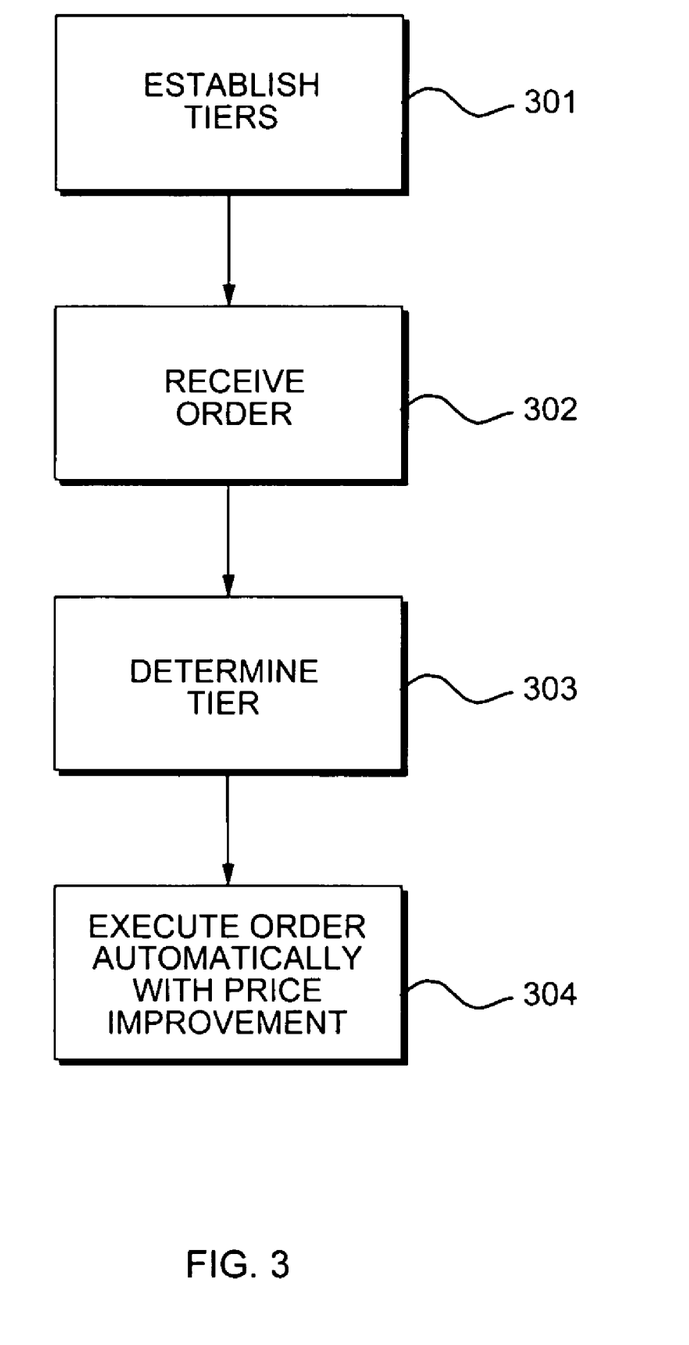
FIGS. 3, 4 and 5 are flow charts illustrating preferred embodiments of methods of the present invention.

With reference to FIG. 3, one or more tiers are established, in step 301. The tiers represent a range of values associated with a trade size and a percentage of an average daily volume of trading in a security, such as those illustrated above in Table 3. Each one or more of the tiers is associated with a price improvement. An order to trade in the security is received, in step 302. The order is associated with an order size. The tier within which the order falls is determined, in step 303, based on the order size and the percentage of the average daily volume. At least a portion of the order is automatically executed, in step 304, with the price improvement associated with the determined tier.

Figure 4:
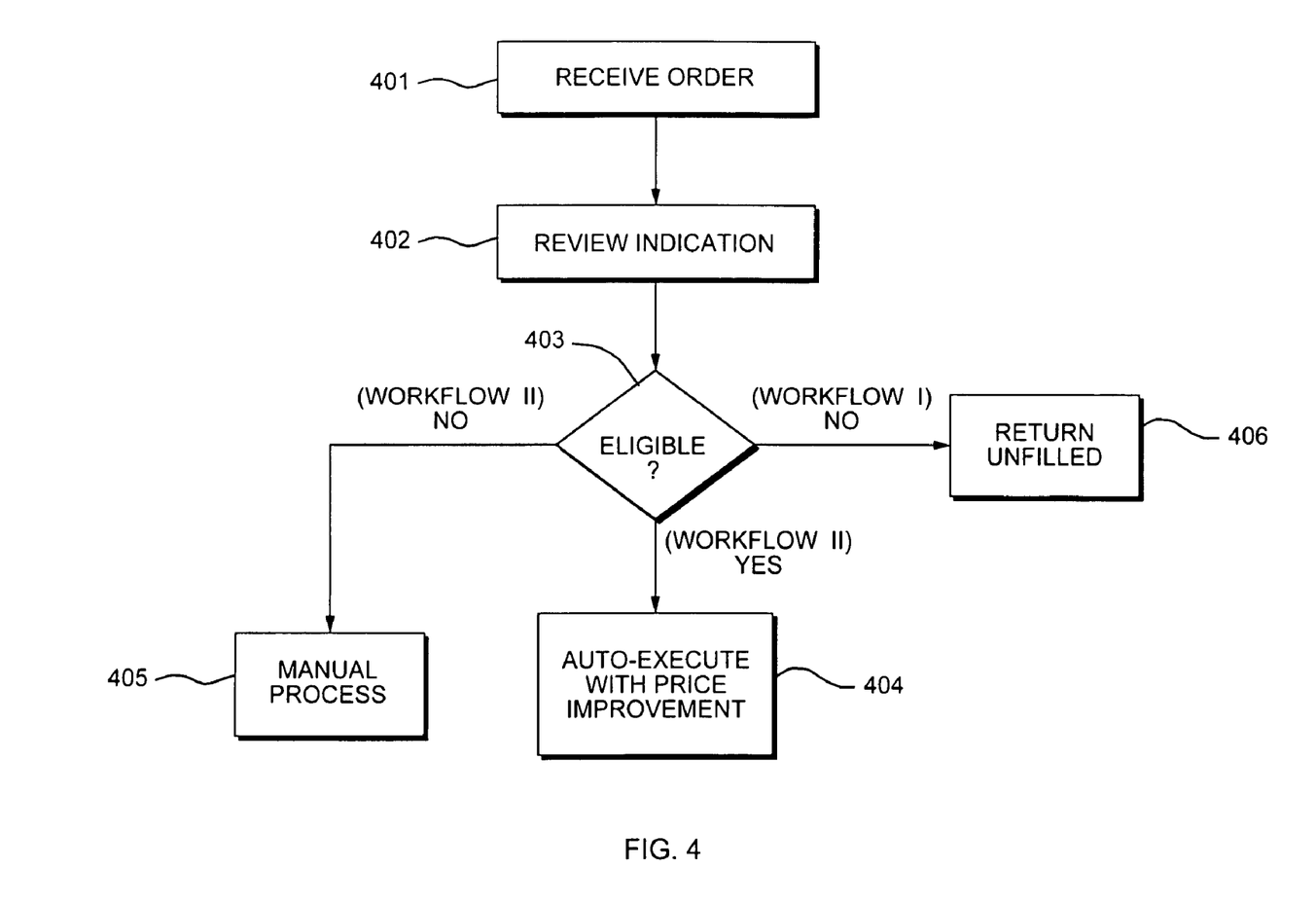

With reference to FIG. 4, an order to trade securities is received, in step 401. The order is associated with an indication. The indication is reviewed in step 402; based on the indication, the order is processed in accordance with one of a plurality of workflows. In step 403, it is determined whether the order meets certain eligibility requirements. In accordance with one of the workflows, at least a portion of the order is automatically executed with a price improvement if the order meets the eligibility requirements, in step 404, or is processed manually, in step 405, if the order fails to meet the eligibility requirements. In accordance with at least one other of the workflows, the order is returned unfilled, in step 406, if it fails to meet the eligibility requirements.

Figure 5:
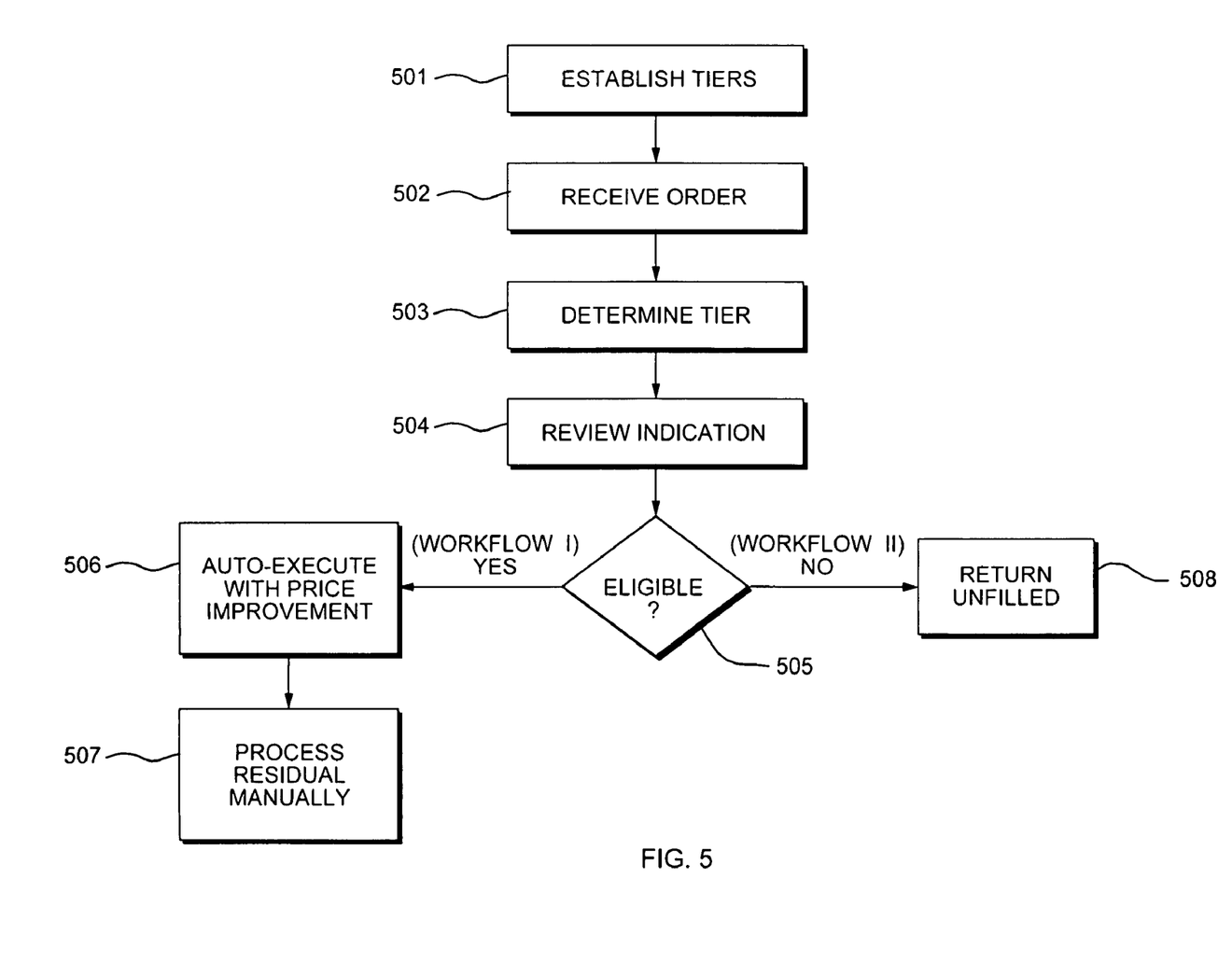

With reference to FIG. 5, tiers are established in step 501. As with the method illustrated in FIG. 3, the tiers represent a range of values associated with a trade size and a percentage of an average daily volume of trading a security. Each of one or more of the tiers is associated with a price improvement. An order to trade in the security is received, in step 502. The order is associated with an order size and an indication. The tier within which the order falls is determined, in step 503, based on the order size and the percentage of the average daily volume. The indication is reviewed in step 504; based on the indication, the order is processed in accordance with one of a plurality of workflows. In step 505, it is determined whether the order meets certain eligibility requirements. In accordance at least one of the workflows, a portion of the order, up to the size associated with the determined tier, is automatically executed with the price improvement associated with the determined tier if the order meets the eligibility requirements, in step 506, and a residual of the order exceeding the size associated with the determined tier is processed manually, in step 507. In accordance with at least one other of the workflows, the residual of the order exceeding the size associated with the determined tier is returned unfilled, in step 508.

In one embodiment, a system for processing an order to trade securities includes an order management component (e.g., order management system 300 of FIG. 1) that receives an order to trade in a security. The order is associated with an order size. A processor (e.g. engine 400 of FIG. 1) determines a tier within which the order falls based on the order size and an average daily volume of trading in the security. The tier includes one of a plurality of tiers representing a range of values associated with a trade size and an average daily volume of trading in a security. Each of one or more of the tiers is associated with a price improvement. The processor 400 automatically executes at least a portion of the order with a price improvement associated with the determined tier.

In one embodiment, the system for processing an order to trade securities includes an order management component 300 that receives an order to trade securities. The order is associated with one of first and second execution indications. A processor 400 that automatically executes the order with a predetermined price improvement if the order meets one or more eligibility requirements. The order is processed manually if the order fails to meet one or more of the eligibility requirements and the order is associated with the first execution indication. The order is returned unfilled if the order fails to meet one or more of the eligibility requirements and the order is associated with the second execution indication.

In one embodiment, the system for processing an order to trade securities includes the order management component 300 that receives an order to trade in a security. The order being associated with an order size and one of first and second execution indications. The processor 400, in communication with the order management component 300, determines a tier within which the order falls based on the order size and an average daily volume of trading in the security. The tier includes one of a plurality of tiers representing a range of values associated with a trade size and an average daily volume of trading in a security. Each of one or more of the tiers is associated with a price improvement. The processor 400 automatically executes a portion of the order, up to the trade size associated with the determined tier, with the price improvement associated with the determined tier, if the order meets one or more predetermined eligibility requirements. A residual of the order exceeding the trade size associated with the determined tier being manually processed if the order is associated with the first execution indication. The residual of the order exceeding the trade size associated with the determined tier is returned unfilled if the order is not associated with the second execution indication.

In another embodiment, the system includes a routing component (e.g. routing system 200 of FIG. 1) that receives an order electronically from a network and transmits the order to the order management component 300.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A computer-readable storage medium comprising instructions which, when executed by a data processing apparatus, perform a method for processing an order to trade securities, the method comprising:

establishing one or more tiers, the tiers representing a range of values associated with a trade size and an average daily volume of trading in a security, each of one or more of the tiers being associated with a predetermined price improvement;

receiving an order to trade in the security, the order being associated with an order size;

determining the tier within which the order falls based on the order size and the average daily volume if the order is within the range of values; and automatically executing at least a portion of the order with the price improvement associated with the determined tier.

2. The computer-readable storage medium of claim 1, the method further comprising:

executing the order based on a classification of the security.

3. The computer-readable storage medium of claim 1, the method further comprising:

establishing a trading limit for a client; and adjusting the trading limit according to market activity.

4. The computer-readable storage medium of claim 1, wherein two or more tiers are established.

5. The computer-readable storage medium of claim 1, wherein the order is associated with a client and the method further comprising:

determining whether the tier is available for use with the client; and automatically executing the order with the price improvement associated with the determined tier if the tier is available for use with the client.

6. The computer-readable storage medium of claim 1, wherein the securities comprise multiple asset classes.

7. The computer-readable storage medium of claim 6, wherein the multiple asset classes comprise derivatives.

8. The computer-readable storage medium of claim 1, wherein the securities comprise synthetics.

9. A computer-readable storage medium comprising instructions which, when executed by a data processing apparatus, perform a method for processing an order to trade securities, the method comprising:

receiving an order to trade securities, the order being associated with one of first and second execution indications;

automatically executing at least a portion of the order with a predetermined price improvement if the order meets one or more predetermined eligibility requirements, at least a portion of the order being manually processed if the order fails to meet one or more of the predetermined eligibility requirements and is associated with the first execution indication; and returning the order unfilled if the order fails to meet one or more of the predetermined eligibility requirements and is associated with the second execution indication.

10. The computer-readable storage medium of claim 9, wherein the order is received electronically over a network.

11. A computer-readable storage medium comprising instructions which, when executed by a data processing apparatus, perform a method for processing an order to trade securities, the method comprising:

establishing one or more tiers, the tiers representing a range of values associated with a trade size and an average daily volume of trading a security, wherein each of one or more of the tiers is associated with a predetermined price improvement;

receiving an order to trade in the security, the order being associated with an order size and one of first and second execution indications;

determining the tier within which the order falls based on the order size and the average daily volume;

automatically executing a portion of the order, up to the trade size associated with the determined tier, with the price improvement associated with the determined tier, if the order meets one or more predetermined eligibility requirements, a residual of the order exceeding the trade size associated with the determined tier being manually processed if the order is associated with the first execution indication; and returning the residual of the order exceeding the trade size associated with the determined tier unfilled if the order is associated with the second execution indication.

12. A computer-readable storage medium comprising instructions which, when executed by a data processing apparatus, perform a method for trading a security, the method comprising:

submitting an order to trade in a security, the order being associated with an order size; and receiving automatic execution of at least a portion of the order with a predetermined price improvement associated with a determined tier, the tier determined based on the order size and an average daily volume of trading in the security, the tier comprising one of a plurality of tiers representing a range of values associated with a trade size and an average daily volume of trading in a security, each of one or more of the tiers associated with the price improvement.

13. A computer-readable storage medium comprising instructions which, when executed by a data processing apparatus, perform a method for trading a security, the method comprising:

submitting an order to trade securities, the order associated with one of first and second execution indications; and receiving one of an automatic execution of the order with a price improvement and an unfilled return of the order, at least a portion of the order being automatically executed with a predetermined price improvement if the order meets one or more predetermined eligibility requirements, at least a portion of the order being manually processed if the order fails to meet one or more of the predetermined eligibility requirements and is associated with the first execution indication, and at least a portion of the order being returned unfilled if the order fails to meet one or more of the predetermined eligibility requirements and is associated with the second execution indication.

14. A computer-readable storage medium comprising instructions which, when executed by a data processing apparatus, perform a method for trading a security, the method comprising:

submitting an order to trade in a security, the order being associated with an order size and one of first and second execution indications; and receiving one of an automatic execution of the order with a predetermined price improvement and an unfilled return of the order, at least a portion of the order, up to the trade size associated with a determined tier, being automatically executed, with the price improvement associated with the determined tier, if the order meets one or more eligibility requirements, the tiers representing a range of values associated with a trade size and an average daily volume of trading a security, each of one or more of the tiers associated with the price improvement, the order being associated with one of the tiers based on the order size and the average daily volume, a residual of the order exceeding the trade size associated with the determined tier being manually processed if the order is associated with the first execution indication, and the residual of the order exceeding the trade size associated with the determined tier being returned unfilled if the order is associated with the second execution indication.

15. A system for processing an order to trade securities, the system comprising:

an order management component that receives an order to trade in a security, the order being associated with an order size; and a processor that (i) determines a tier within which the order falls based on the order size and an average daily volume of trading in the security, the tier comprising one of a plurality of tiers representing a range of values associated with a trade size and an average daily volume of trading in a security, each of one or more of the tiers being associated with a price improvement, and (ii) automatically executes at least a portion of the order with a price improvement associated with the determined tier.

16. The system of claim 15 further comprising:

a routing component that receives an order electronically from a network and transmits the order to the order management component.

17. A system for processing an order to trade securities, the system comprising:

an order management component that receives an order to trade securities, the order being associated with one of first and second execution indications; and a processor that, automatically executes the order with a predetermined price improvement if the order meets one or more predetermined eligibility requirements, the order being processed manually if the order fails to meet one or more of the eligibility requirements and the order is associated with the first execution indication, the order being returned unfilled if the order fails to meet one or more of the eligibility requirements and the order is associated with the second execution indication.

18. The system of claim 17 further comprising:

a routing component that receives an order electronically from a network and transmits the order to the order management component.

19. A system for processing an order to trade securities, the system comprising:

an order management component that receives an order to trade in a security, the order being associated with an order size and one of first and second execution indications; and a processor in communication with the order management component that (i) determines a tier within which the order falls based on the order size and an average daily volume of trading in the security, the tier comprising one of a plurality of tiers representing a range of values associated with a trade size and an average daily volume of trading in a security, each of one or more of the tiers being associated with a predetermined price improvement, and (ii) automatically executes a portion of the order, up to the trade size associated with the determined tier, with the price improvement associated with the determined tier, if the order meets one or more predetermined eligibility requirements, a residual of the order exceeding the trade size associated with the determined tier being manually processed if the order is associated with the first execution indication, and the residual of the order exceeding the trade size associated with the determined tier being returned unfilled if the order is associated with the second execution indication.

20. The system of claim 19 further comprising:

a routing component that receive an order electronically from a network and transmits the order to the order management component.

* * * * *

UNITED STATES PATENT AND TRADEMARK OFFICE
CERTIFICATE OF CORRECTION

PATENT NO. : 7,640,208 B2
APPLICATION NO. : 11/592710
DATED : December 29, 2009
INVENTOR(S) : Karl Grossman Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this

Ninth Day of November, 2010

David J. Kappos
*Director of the United States Patent and Trademark Office*